United States Patent
Yamashita

(10) Patent No.: US 6,333,621 B2
(45) Date of Patent: Dec. 25, 2001

(54) METHOD OF FAST-CHARGING OF A RECHARGEABLE BATTERY

(75) Inventor: Takahiro Yamashita, Sumoto (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/746,226

(22) Filed: Dec. 26, 2000

(30) Foreign Application Priority Data

Dec. 27, 1999 (JP) .................................................. 11-368792

(51) Int. Cl.[7] .................................................. H02J 7/00
(52) U.S. Cl. .................................................. 320/160; 320/148
(58) Field of Search .................................... 320/160, 162, 320/152, 153, 151, 148

(56) References Cited

U.S. PATENT DOCUMENTS 5,497,068 * 3/1996 Shiojima et al. ............... 320/150
5,550,453 * 8/1996 Bohne et al. ................... 320/148

FOREIGN PATENT DOCUMENTS 0 623 986    11/1994    (EP) .
2 265 056    9/1993    (GB) .

\* cited by examiner

*Primary Examiner*—Gregory Toatley
(74) *Attorney, Agent, or Firm*—Wenderoth, Lind & Ponack, L.L.P.

(57) ABSTRACT

In the method of fast-charging of a rechargeable battery, full-charge state is determined on the basis of a peak battery voltage or a decrease ΔV in the battery voltage after the peak voltage. At the beginning of the fast-charge process, an initial battery voltage is measured. In case where the initial voltage is higher than a preselected voltage, the battery is fast-charged with a normal fast-charge current. In case where the initial voltage is lower than the preselected voltage, the battery is fast-charged with a restricted fast-charge current that is weaker than the fast-charge current.

14 Claims, 4 Drawing Sheets

METHOD OF FAST-CHARGING OF A RECHARGEABLE BATTERY

This application is based on application No. 11-368792 filed in Japan on Dec. 27, 1999, the content of which incorporated hereinto by reference.

BACKGROUND OF THE INVENTION

The present invention relates mainly to a method of charging a rechargeable battery such as nickel-cadmium (Ni—Cd) battery or nickel-metal hydride (Ni-MHD) battery, which shows a decrease, $\Delta V$, in voltage from the peak voltage after it is fully charged.

In order to charge a rechargeable battery, it is important to detect the full-charge state and to stop supplying charging current on the completion of full capacity charge (100%), because overcharging causes reduced battery quality on one side, and incomplete charge, i.e. less than 100% capacity charge and leads to a shorter service time on the other. But it is not easy to charge a rechargeable battery to the full capacity under various conditions.

A rechargeable battery such as Ni—Cd battery or Ni-MHD battery shows a decrease, $\Delta V$, from the peak voltage when the charging continues after it has benn fully charged. This characteristic is utilized to detect the full-charge state of a rechargeable battery.

Under normal conditions, the full charge state can be detected accurately by detecting the peak voltage or a decrease, $\Delta V$, in voltage. The rechargeable battery with an unduly low output voltage caused by overdischarge shows charge voltage characteristics different from normal characteristics, when it is fast-charged. Some rechargeable batteries with unduly low output voltage are no longer usable because of an internal short circuit. In order to discriminate batteries between usable ones and unusable ones, weak charging current is supplied in the first step of fast-charging until the output voltage reaches a predetermined voltage, for example 1V, then fast-charging begins.

FIG. 1 shows a voltage curve in a fast-charging process of a battery with overdischarge. As shown in the figure, the charge voltage shows a sharp rise immediately after the fast-charge process begins following the preliminary charge then the charge voltage decreases. Thus a characteristic curve shows a decrease, $\Delta V$, in voltage after it reaches a peak value. When the charge voltage changes in the similar curve pattern, the battery charger determines the completion of the charging process and terminates the charging process. Thus charging process is terminated before the battery has been fully charged. The rise to the peak and decrease, $\Delta V$, in the charge voltage is remarkable when the battery temperature is low.

In order to overcome the drawback, a new method has been proposed in which detection of the voltage decrease is nullified for a certain period of time after the quick charge process begins following the preliminary charge. But the method has the difficulty of setting the time period during which the voltage detection is nullified. In the case where an unduly long time period is predetermined, overcharging which tends to reduce battery quality often occurs due to the failure in detecting the full-charge state.

In the case where an unduly short period time is predetermined, charging is no longer possible for the battery which shows the voltage decrease, $\Delta V$, before the full-charge state has been reached.

The present invention has been developed to overcome these drawbacks. The main objective of the present invention is to propose a method of fast-charging of overdischarged rechargeable batteries capable of accurately charging to the full-charge state.

The above and further objectives and features of the invention will more fully be apparent from the following detailed description with accompanying drawings.

SUMMARY OF THE INVENTION

The method of present invention for fast-charging a rechargeable battery resides in that the completion of charging operation is determined by detecting a peak voltage or decrease in battery voltage from the peak voltage. The method of the present invention for fast-charging further includes a step for detecting the initial battery voltage at the beginning of charging process. If the initial voltage is higher than a predetermined level, the battery is fast-charged with a preselected fast-charge current. If the initial voltage is lower than the predetermined level, the battery is fast-charged with a restricted fast charge current which is smaller than the fast-charge current.

The present method of fast-charging has the advantage that it enables to fast-charge a normally discharged battery on one hand, and to charge an overdischarged battery to the full charge state on the other. An overdischarged battery shows a peak voltage followed by a decrease, $\Delta V$, in voltage before the battery is fully charged, when it undergoes a fast-charge operation with normal fast-charge current. In the method of the present invention, an overdischarged battery is fast-charged with restricted fast-charge current which prevents the battery from showing a peak battery voltage or a decrease in $\Delta V$ before it is fully charged. The method enables to detect the completion of the fast-charge operation for an overdischarged battery on the basis of peak voltage or a decrease, $\Delta V$, in voltage.

The method of the present invention for fast-charging preferably includes steps for detecting the battery voltage as well as the battery temperature at the beginning of the charging. If the initial battery voltage is higher than the predetermined level and the battery temperature is higher than a predetermined level, the battery is fast-charged with fast-charge current. But, if the initial battery voltage is lower than the predetermined level and the battery temperature is below the predetermined level, the battery is fast-charged with the limited and smaller fast-charge current.

The limited fast-charge current is set, for example, at 50~90% of the fast-charge current. The smaller the limited fast-charge current, the fewer is the incidents of false detection of full-charge state. But smaller restricted fast-charge currents lead to a longer full charge time. The restricted fast-charge current is therefore determined at a larger possible level as long as incidents of false detection of full-charge state can be avoided.

Yet another embodiment of the present invention for fast-charging a rechargeable battery preferably includes a step for preliminary charge with preliminary charge current smaller than restricted fast-charge current preceding the fast-charge in the case where the initial battery voltage is higher than the predetermined level and lower than a level which is predetermined for the preliminary charge.

DETAILED DESCRIPTION OF THE INVENTION

Figure 1:
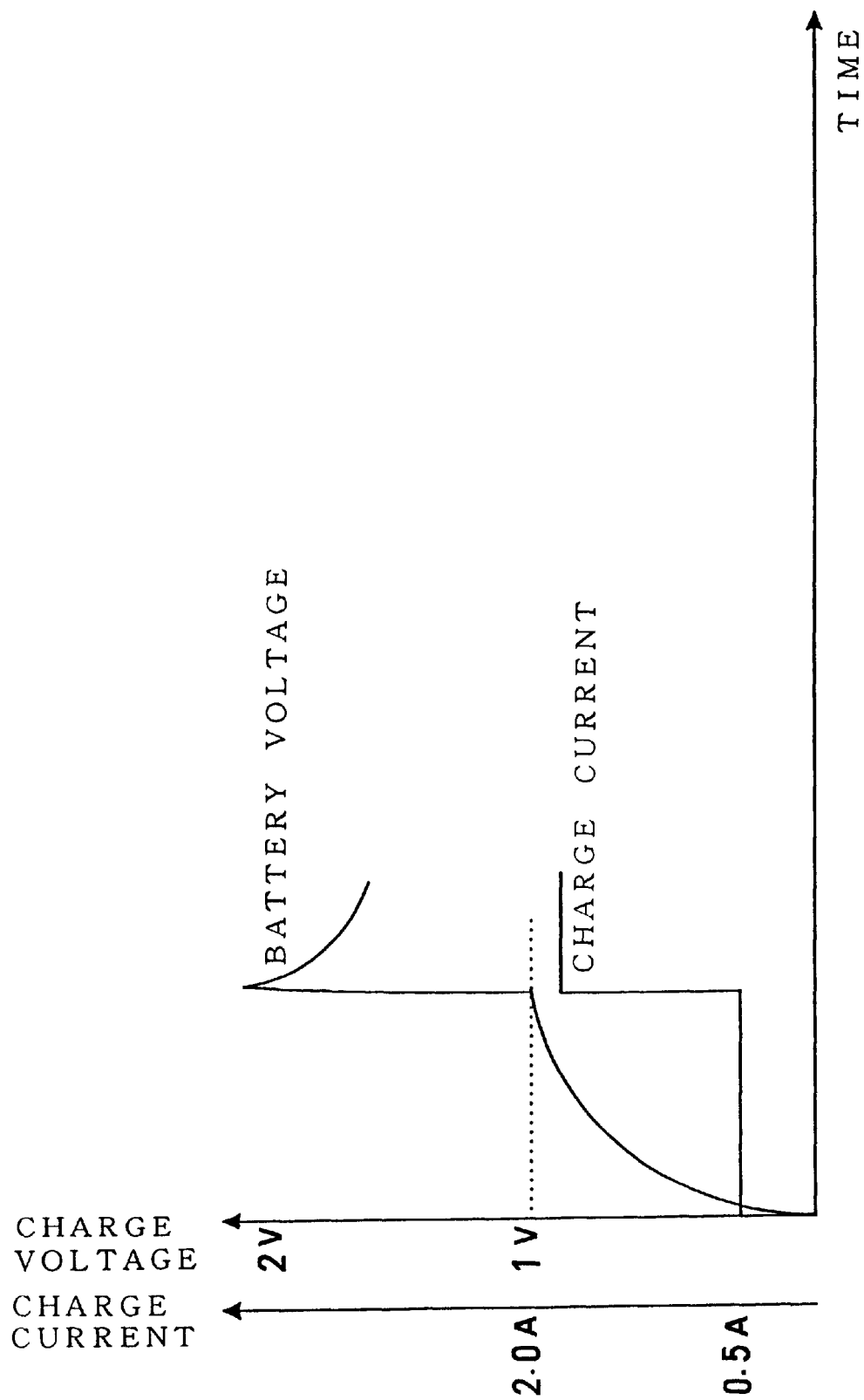
FIG. 1 shows a diagram of a battery voltage characteristics of a overdischarged rechargeable battery during the fast-charging operation.
Figure 2:
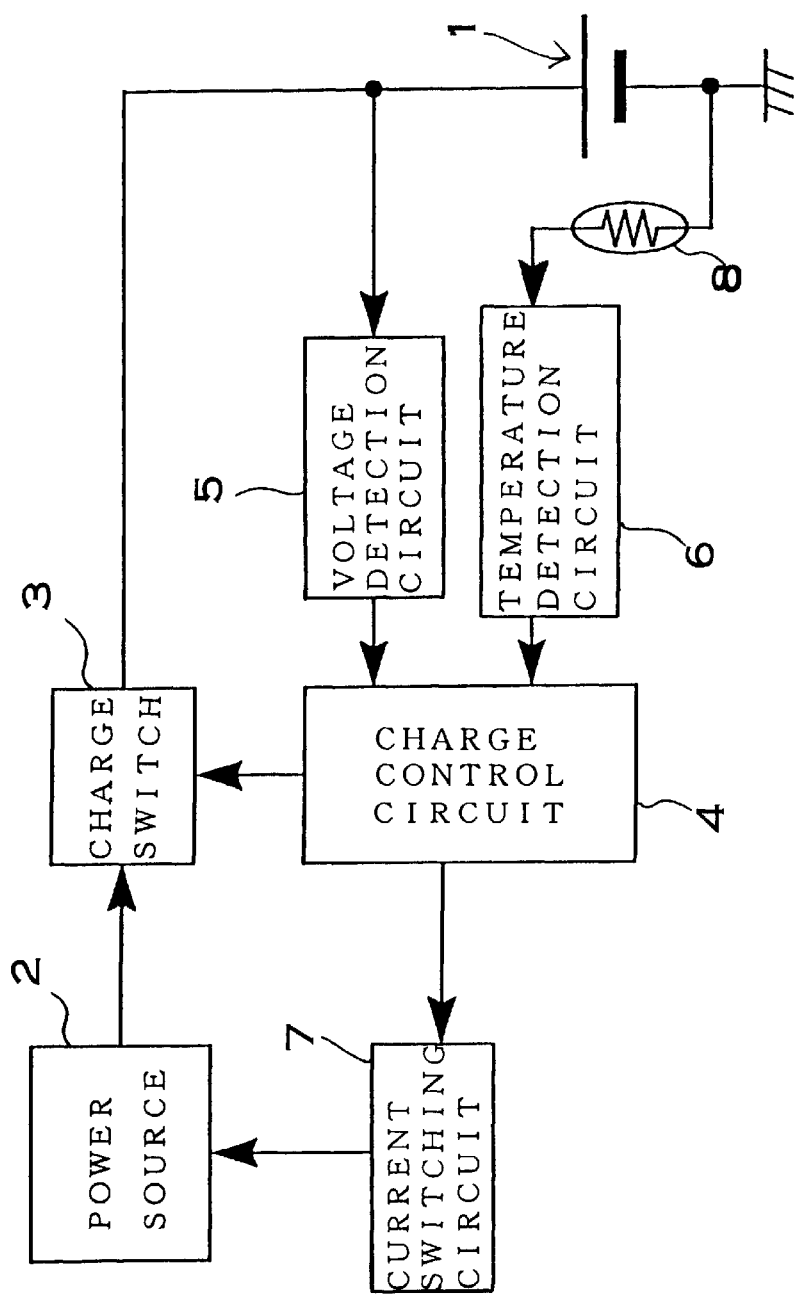
FIG. 2 shows a circuit of fast-charging device set forth as means for fast-charge of the present invention.

FIG. 2 is a block diagram showing a circuit for practicing the method of fast-charge of the invention. The battery charging circuit includes a power source 2 for supplying voltage and current to a rechargeable battery 1, a charge switch 3 connected to the output terminals of the power source, a charge control circuit 4 for controlling the charge switch 3, a voltage detection circuit 5 for detecting the battery voltage of the rechargeable battery 1, a temperature detection circuit 6 for detecting the battery temperature and a current switching circuit 7 controlled by the charge control circuit for controlling the output of the power source 2.

The fast-charge circuit shown in the drawings is designed for charging a rechargeable battery such as Ni—Cd battery or Ni-MHD battery, which has the characteristics that a decrease in the battery voltage occurs if the charging continues after the peak voltage appears at the time when the battery is fully charged.

The power source 2 is provided with a circuit capable of limiting the maximum voltage and maximum current, i.e. a constant-voltage and constant-current circuit. The power source 2 is capable of charging with optimum voltage and current. The power source is also capable of switching output current either to the normal fast-charge current or to the restricted fast-charge charge current in response to the current switching circuit 7. The power source 2 either fast-charges a normally discharged battery with the normal fast-charge current or fast-charges an overdischarged battery with the restricted current.

The normal fast-charge current is preset at an optimum value taking the types of the battery into consideration. A rechargeable battery has its own maximum charge current according to its battery type. Accordingly, the normal fast-charge current, which is the output current of the power source 2, is set for an optimum value, e.g.0.5~2C, with which the battery can be fast-charged as quickly as possible without reducing battery quality.

The restricted fast-charge current is set at 50~90%, preferably at 60~85%, furthermore preferably at 65~85% or most preferably at 80% of the normal fast-charge current. The amplitude of the restricted fast-charge current is so selected that the fast-charge current gives no false signals of full-charge state in detecting a peak voltage or a decrease from the peak voltage.

Figure 3:
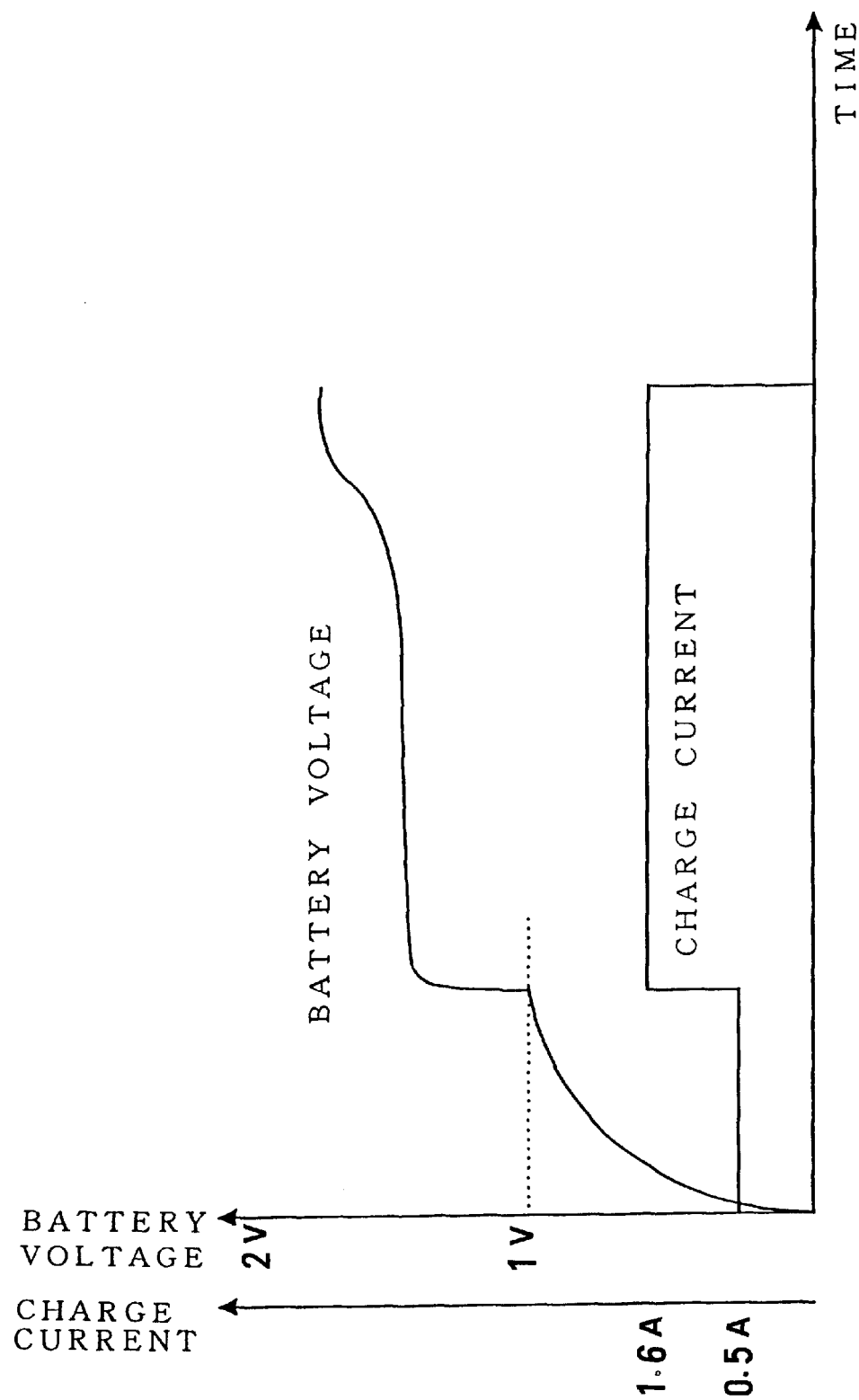
FIG. 3 shows a diagram of a battery voltage characteristics of a overdischarged rechargeable battery during the fast-charging with restricted current.

FIG. 3 shows how the battery voltage changes as the fast-charge proceeds. As is shown in the FIG. 3, during the fast-charge operation with the restricted fast-charge current, which is smaller than the normal fast-charge current, the battery voltage shows a sharp rise immediately after the normal fast-charge current is applied. In this case, the battery voltage does not hit a peak or does not decrease from a peak voltage.

In charging an overdischarged battery, as the restricted fast-charge current becomes heavier, a peak voltage tends to appear immediately after the charge current shifts to the normal fast-charge current, and then the charge voltage decreases by $\Delta V$ from the peak voltage. In cases where the charge control circuit 4 is of the type that determines full-charge state not by the peak voltage, but by the voltage decrease $\Delta V$ from the peak voltage, the restricted fast-charge current can be selected at such a value that gives a peak voltage at the time of the charge current shift to fast-charge because full-charge detection is not based on a peak voltage at the time of the charge current shift to fast-charge. On the other hand, in cases where the charge control circuit 4 determines the full-charge state on the basis of peak voltage, the circuit misjudges the full-charge state upon the peak voltage at the time of the charge current shift to fast-charge. Therefore, in cases where the charge control circuit 4 determines the full-charge state on the basis of peak voltage, the restricted fast-charge current must be set at the value that yields no peak voltage at the time when the charge current shifts to fast-charge current.

Upon detection of full-charge state of a rechargeable battery 1, the charge control circuit 4 turns the charge switch 3 from 'on' to 'off'. The charge control circuit 4 keeps the charge switch 3 at 'on' state to keep charging the battery until the battery 1 is fully charged. When the rechargeable battery 1 reaches the full-charge state, the circuit 4 turns the charge switch off to terminate charging. The charge control circuit 4 detects either the peak voltage or the charge voltage decrease $\Delta V$, or both of them during charging operation to determine the full-charge state.

The charge control circuit 4 detects initial battery voltage and battery temperature at the beginning of charging operation to control the charge current from the power source 2 by means of a current switching circuit 7. The charge control circuit 4 controls the charge current from the power source 2 by means of the current switching circuit 7 such that the normal fast-charge current is supplied for fast charging in case where the initial battery voltage or the battery temperature is higher than a predetermined level. In cases where both initial battery voltage and battery temperature are lower than a predetermined level, the charge control circuit controls the current switching circuit 7 to allow the power source 2 to supply the restricted fast-charge current.

The voltage detection circuit 5 detects battery voltage and inputs the signal to the charge control circuit 4. The temperature detection circuit 6 detects battery temperature and inputs the signals to the charge control circuit 4. The temperature detection circuit 6 is connected to a temperature detection device 8 which is placed in contact with or close to the battery to be charged to detect battery temperature.

Figure 4:
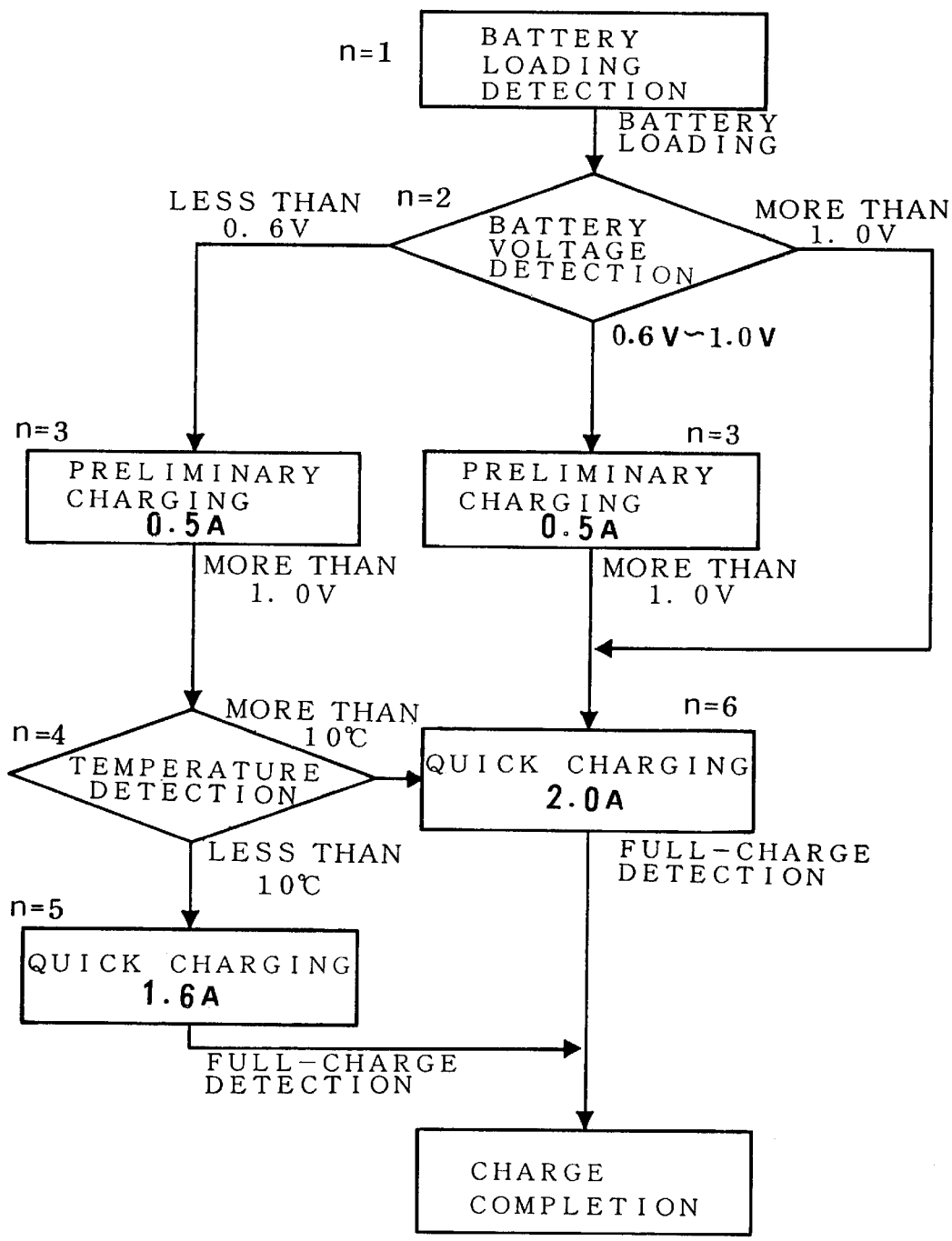
FIG. 4 shows a flow chart of steps of fast-charge operation carried out by the fast-charge device as set forth in FIG. 2.

FIG. 4 is a flowchart of the operation performed by the charge control circuit 4 which fast-charges a battery with a normal charge current or restricted charge current supplied via the current switching circuit 7 from the power source 2. Charging operation for a rechargeable battery 1 shown in the flowchart is performed through following steps.

[Step n=1]

Battery loading detection. Loading of a battery is detected, e.g. by measuring voltage by means of the voltage detection circuit 5, or by mechanical means e.g. a limit switch.

[Step n=2]

The initial battery voltage is measured and compared with a predetermined voltage and preliminary charge voltage in order to put the battery into either of three categories, i.e. an overdischarged battery that has a lower initial voltage than the predetermined voltage, a discharged battery that has a initial voltage between the predetermined voltage and preliminary charge voltage, and a non-discharged battery whose initial voltage is higher than the preliminary charge voltage. For a non-discharged battery, the fast-charged with normal charge voltage is carried out without preliminary charge.

The flowchart is shown as performing the charging operation of a Ni—Cd or Ni-MHD battery, the predetermined voltage and preliminary charge voltage is set at 0.6V/cell and 1V/cell respectively. The predetermined voltage and preliminary charge voltage may vary according to the battery type. For Ni—Cd battery or Ni-MH battery, the predetermined voltage is set at 0.4~0.8V and the preliminary charge voltage at 0.8~1 .1V. The preliminary charge voltage is always higher than the predetermined voltage.

[Step n=3]

Overdischarged and discharged batteries undergo a preliminary charge carried out with a weaker current. Non discharged batteries are fast-charged without preliminary charge. In the flowchart, the value 0.5A is selected for preliminary charge, i.e. 25% of the normal fast-charge current. The preliminary charge current is preferably set at 5~30% of the normal fast-charge current. The preliminary charge is completed when the battery voltage reaches the preliminary voltage. The preliminary charge may be interrupted when a timer counts up a preselected time.

[Step n=4]

The battery temperature is measured and compared with predetermined temperature after preliminary charge of an overdischarged battery. The predetermined temperature is set at 10 degrees centigrade. The predetermined temperature is so chosen that the peak voltage and the voltage decease appear when the normal fast-charge current is supplied.

[Step n=5]

If the battery temperature is lower than the preselected value, the battery is fast-charged with restricted fast-charge current. In the embodiment shown in the flowchart, the restricted fast-charge current is set at 1.6A, i.e. 80% of normal fast-charge current. The fast-charge step with restricted fast-charge current is completed when battery voltage reaches the peak voltage or decreases by $\Delta V$ from the peak voltage.

[Step n=6]

If the battery temperature is higher than the preselected value, the battery is fast-charged with normal fast-charge current. The fast-charge step with normal fast-charge current is completed when battery voltage reaches the peak voltage or decreases $\Delta V$ from the peak voltage.

In the flowchart described above, the temperature detection is performed for overdischarged batteries that have the initial voltage lower than predetermined value, and fast-charge with restricted fast-charge current is carried out only if the battery temperature is lower than the preselected value. Within the scope of the present invention, it is possible to fast-charge overdischarged batteries with restricted fast-charge current without battery temperature detection. In this case, the step n=4 is skipped and all the overdischarged batteries which have undergone the preliminary charge are fast-charged with restricted fast-charge current.

In the method of fast-charging described above, the batteries, which are classified as overdischarged or discharged for the initial battery voltage lower than predetermined voltage, are fast-charged after the preliminary charge. With the preliminary charge included, the present method of fast-charging enables to find damaged batteries on none hand, and to charge under optimum conditions batteries used under various conditions on the other.

However, another feature of the method of the present invention includes fast-charging with restricted fast-charge current of an overdischarged battery without the step of preliminary charge.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method of fast-charging of a rechargeable battery, wherein full-charge state is determined on the basis of a peak battery voltage or a decrease, $\Delta V$, in the battery voltage after the peak voltage, includes a step for detecting the battery's initial voltage at the beginning of the charging process, a step for fast-charging with a normal fast-charge current of the battery whose initial voltage is higher than a preset voltage and a step for fast-charging with a restricted fast-charge current which is smaller than the fast-charge current of the battery whose initial voltage is lower than the preset voltage.

2. A method of fast-charging of a rechargeable battery as recited in claim 1, wherein said restricted fast-charge current is 50~90% of the normal fast-charge current.

3. A method of fast-charging of a rechargeable battery as recited in claim 1, wherein a preliminary charging is performed with a preliminary charge current which is smaller than the restricted fast-charge current before the fast-charge operation in the event of the initial voltage being higher than the preset voltage but lower than the preliminary charge voltage at the initial voltage measurement.

4. A method of fast-charging of a rechargeable battery as recited in claim 1, wherein a preliminary charging is performed with the preliminary charge current in the event of the initial voltage being lower than the preset voltage at the initial voltage measurement before the fast-charge operation with a restricted fast-charge current.

5. A method of fast-charging of a rechargeable battery as recited in claim 4, wherein a preliminary charging is performed with the preliminary charge current in the event of the initial voltage being lower than the preset voltage at the initial voltage measurement, said preliminary charging being followed by the fast-charge operation with a restricted fast-charge current in case where the battery temperature is lower than a predetermined level at the completion of the preliminary charge.

6. A method of fast-charging of a rechargeable battery as recited in claim 3 wherein the preliminary charging is performed with the preliminary charge current for a predetermined period of time in the event of the initial voltage being higher than the preset voltage but lower than the preliminary charge voltage at the initial voltage measurement, said preliminary charging being followed by the fast-charge operation with normal fast-charge current.

7. A method of fast-charging of a rechargeable battery as recited in claim 1, wherein the battery is either a nickel-cadmium battery or a nickel-metal hydride battery.

8. A method of fast-charging of a rechargeable battery, wherein full-charge state is determined on the basis of a peak battery voltage or a decrease, $\Delta V$, in the battery voltage after the peak voltage, includes a step for detecting the battery's initial voltage as well as the battery temperature at the beginning of the charging process, a step for fast-charging with a normal fast-charge current in the event of the initial voltage being higher than a preset voltage or the battery temperature being higher than a preset level and a step for fast-charging with a restricted fast-charge current that is weaker than the fast-charge current in the event of the initial voltage as well as the battery temperature being lower than the preset level.

9. A method of fast-charging of a rechargeable battery as recited in claim 8, wherein said restricted fast-charge current is 50~90% of the normal fast-charge current.

10. A method of fast-charging of a rechargeable battery as recited in claim 8, wherein a preliminary charging is performed in the event of the initial voltage being higher than the preset voltage but lower than the preliminary charge voltage at the initial voltage measurement with a preliminary charge current which is smaller than the restricted fast-charge current before the fast-charge operation.

11. A method of fast-charging of a rechargeable battery as recited in claim 8, wherein a preliminary charging is performed with the preliminary charge current in the event of the initial voltage being lower than the preset voltage at the initial voltage measurement before the fast-charge operation with a restricted fast-charge current.

12. A method of fast-charging of a rechargeable battery as recited in claim 11, wherein a preliminary charging is performed with the preliminary charge current in the event of the initial voltage being lower than the preset voltage at the initial voltage measurement, said preliminary charging being followed by the fast-charge operation with a restricted fast-charge current in case where the battery temperature is lower than a predetermined level at the completion of the preliminary charge.

13. A method of fast-charging of a rechargeable battery as recited in claim 10, wherein the preliminary charging is performed with the preliminary charge current for a predetermined period of time in the event of the initial voltage being higher than the preset voltage but lower than the preliminary charge voltage at the initial voltage measurement, said preliminary charging being followed by the fast-charge operation with normal fast-charge current.

14. A method of fast-charging of a rechargeable battery as recited in claim 8 wherein the battery is either a nickel-cadmium battery or a nickel-metal hydride battery.

* * * * *